(12) United States Patent
Chanut

(10) Patent No.: US 7,328,049 B2
(45) Date of Patent: Feb. 5, 2008

(54) PRE-RESOURCE CHECKING BEFORE FILE DOWNLOAD

(75) Inventor: Didier Chanut, Tokyo (JP)

(73) Assignee: Nokia Corporation, Espoo (FI)

( * ) Notice: Subject to any disclaimer, the term of this patent is extended or adjusted under 35 U.S.C. 154(b) by 850 days.

(21) Appl. No.: 10/185,020

(22) Filed: Jun. 28, 2002

(65) Prior Publication Data
US 2004/0002367 A1    Jan. 1, 2004

(51) Int. Cl.
H04B 1/38     (2006.01)
H04M 1/00    (2006.01)

(52) U.S. Cl. ............... 455/574; 455/573; 455/572; 370/311; 320/134; 320/127; 713/300; 713/320; 713/310

(58) Field of Classification Search .......... 455/405, 455/406, 412.1, 423, 67.11, 343.3, 572–574, 455/419; 709/219, 224, 229; 370/311
See application file for complete search history.

(56) References Cited

U.S. PATENT DOCUMENTS

| | | | | |
|---|---|---|---|---|
| 5,408,520 A | * | 4/1995 | Clark et al. | 379/93.07 |
| 5,713,074 A | | 1/1998 | Hulbert | 455/69 |
| 5,870,685 A | | 2/1999 | Flynn | 455/573 |
| 5,878,228 A | * | 3/1999 | Miller et al. | 709/235 |
| 6,118,988 A | * | 9/2000 | Choi | 455/115.1 |
| 6,150,936 A | | 11/2000 | Addy | 340/539 |
| 6,240,288 B1 | * | 5/2001 | Wan et al. | 455/426.1 |
| 6,275,850 B1 | | 8/2001 | Beyda et al. | 709/206 |
| 6,366,792 B1 | * | 4/2002 | Katsuki | 455/572 |
| 6,721,580 B1 | * | 4/2004 | Moon | 455/574 |
| 7,197,342 B2 | * | 3/2007 | Bhatoolaul et al. | 455/574 |
| 2002/0058537 A1 | * | 5/2002 | Bhatoolaul et al. | 455/572 |
| 2003/0083041 A1 | * | 5/2003 | Kumar et al. | 455/406 |
| 2004/0121757 A1 | * | 6/2004 | Laumen et al. | 455/405 |
| 2004/0214551 A1 | * | 10/2004 | Kim | 455/412.1 |

FOREIGN PATENT DOCUMENTS

| | | |
|---|---|---|
| JP | 08-286983 | 11/1996 |
| JP | 10-207582 | 8/1998 |
| JP | 2000-311143 | 11/2000 |

* cited by examiner

Primary Examiner—Lester G. Kincaid
Assistant Examiner—Dung Lam
(74) Attorney, Agent, or Firm—Alston & Bird LLP

(57) ABSTRACT

The availability of one or more resources consumable in operating a mobile terminal and in downloading a file or collection of files to the terminal is reviewed before the file or collection of files is downloaded to the mobile terminal. An estimate is made of the amount of the resource(s) that would be consumed in the download. The download proceeds only if the available resource(s) are sufficient The estimate of the amount of the resource that will be consumed in the download may be based on a prior download of a header of the file(s) to be downloaded. Alternatively, the estimate may be based on the transmission rate of incoming data in combination with one or more of signal strength, bit error rate and the distance between the mobile terminal and a base station from which the file is to be transmitted to the mobile terminal.

30 Claims, 9 Drawing Sheets

PRE-RESOURCE CHECKING BEFORE FILE DOWNLOAD

BACKGROUND OF THE INVENTION

1. Field of the Invention

The present invention is directed to downloading data to mobile terminals. More specifically, the invention concerns pre-checking the availability of resources consumable in downloading data to mobile terminals.

2. Description of the Related Art

Mobile terminals, such as phones, PDA's and laptop computers, are increasingly being used to wirelessly download computer files, as from the Internet. These terminals often run on battery power, and the download of larger files can require more power than is available. Having a download terminate for lack of power can be annoying to the user, who has not only failed to complete the download but, in addition, has now expended all of the remaining energy in the device. Moreover, a resource other than power, such as time, may be at a premium. For example, the user may be limited in the amount of remaining airtime for the device, e.g. time allotted for this month, and may choose to avoid a download rather than initiate a download that exceeds the available remaining airtime.

Japanese Patent Application No. 11-119804 discloses a mobile terminal that maintains a memory table indexing minimum power levels against program identifiers. If the program being downloaded requires a minimum power level that exceeds the current remaining power level for the terminal, the download is stopped. However, power levels are checked only for a predetermined set of programs. If the user decides to download a program not included within the set, e.g., a program just learned of while on the Internet, the system does not perform its checking function. Another drawback is that the power levels used as a reference are fixed in the memory table. It is thus assumed that the size of a downloadable file remains constant, which is not the case. In addition, there is no adjustment for transient variances in the amount of energy needed for a download based on received signal strength and quality, transmission rate, bit error rate, distance from the receiver, etc.

SUMMARY OF THE INVENTION

The present invention is directed to an apparatus and method for determining whether to initiate a file download to a mobile terminal based on the amount of power that remains available in the mobile terminal. If the mobile terminal has insufficient energy to complete the download, then the download is not initiated and the user avoids the frustration, waste of time, waste of bandwidth and unnecessary cost entailed in an ultimately unsuccessful attempt to receive a file. Advantageously, the invention accurately assesses the amount of energy required for a successful download based on current, transient factors, such as the recent, actual energy expended in communication. Whether to download can also, or alternatively, be made contingent upon the sufficiency of remaining levels of other resources such as time, memory space and money.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

DETAILED DESCRIPTION OF THE CURRENTLY PREFERRED EMBODIMENTS

Figure 1:
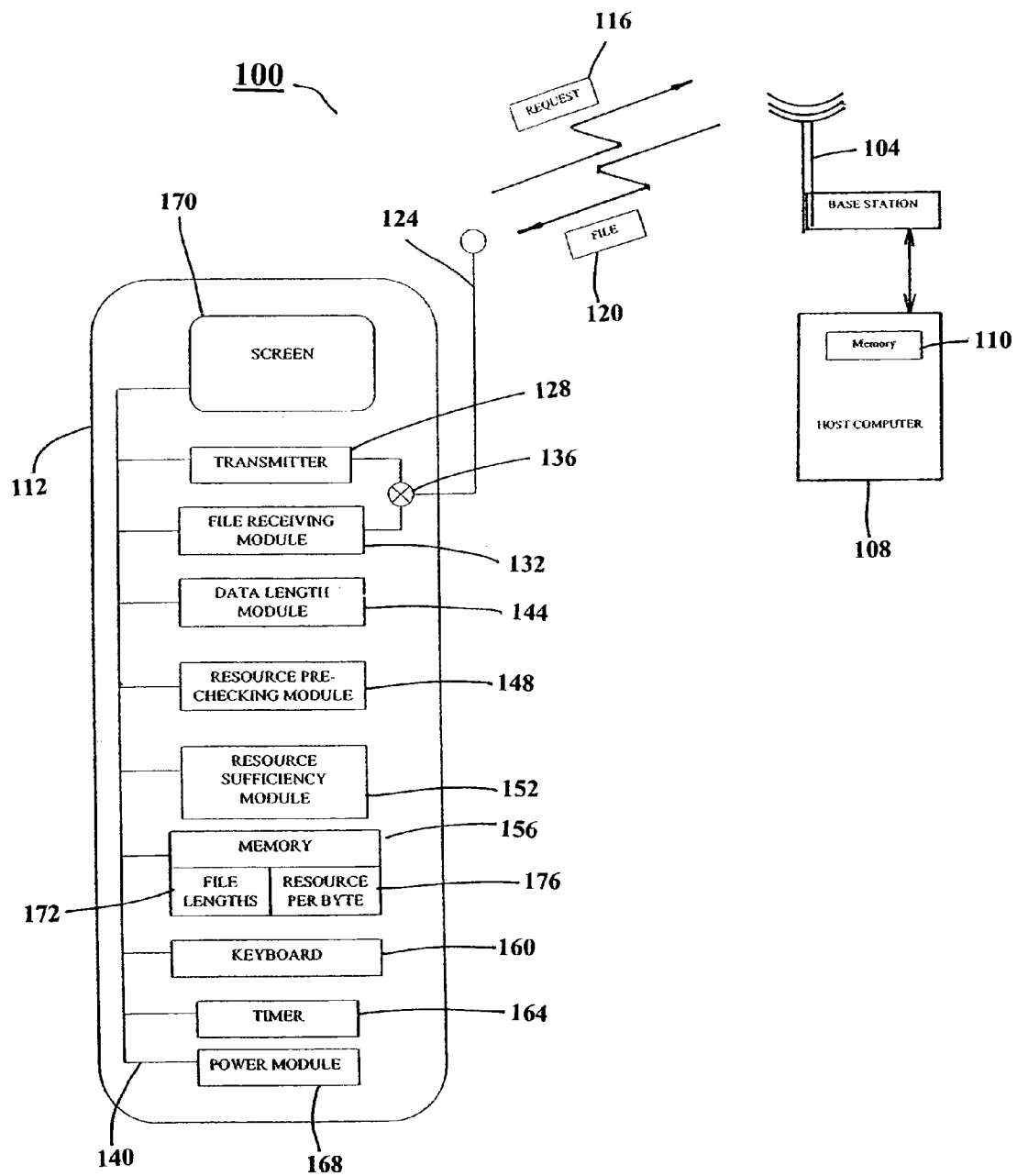
FIG. 1 diagrammatically depicts a mobile communication system in accordance with the present invention.

FIG. 1 depicts a mobile communication system or network 100 in a sample configuration that includes a base station 104 having a wireless or wireline connection to a host computer 108. The host computer 108 has a memory 110 and may be part of a wide area network, the World Wide Web or any other network. The system 100 further includes a mobile phone 112 that transmits data requests 116 to the host computer 108 via the base station 104 and receives files or "collections of data" 120 responsive to the requests 116, the files being downloaded from the host 108. A "collection of data" or a "file", as used herein, refers to any set of data treated as a unit, and may also refer to multiple files to be downloaded as a single unit.

Figure 2:
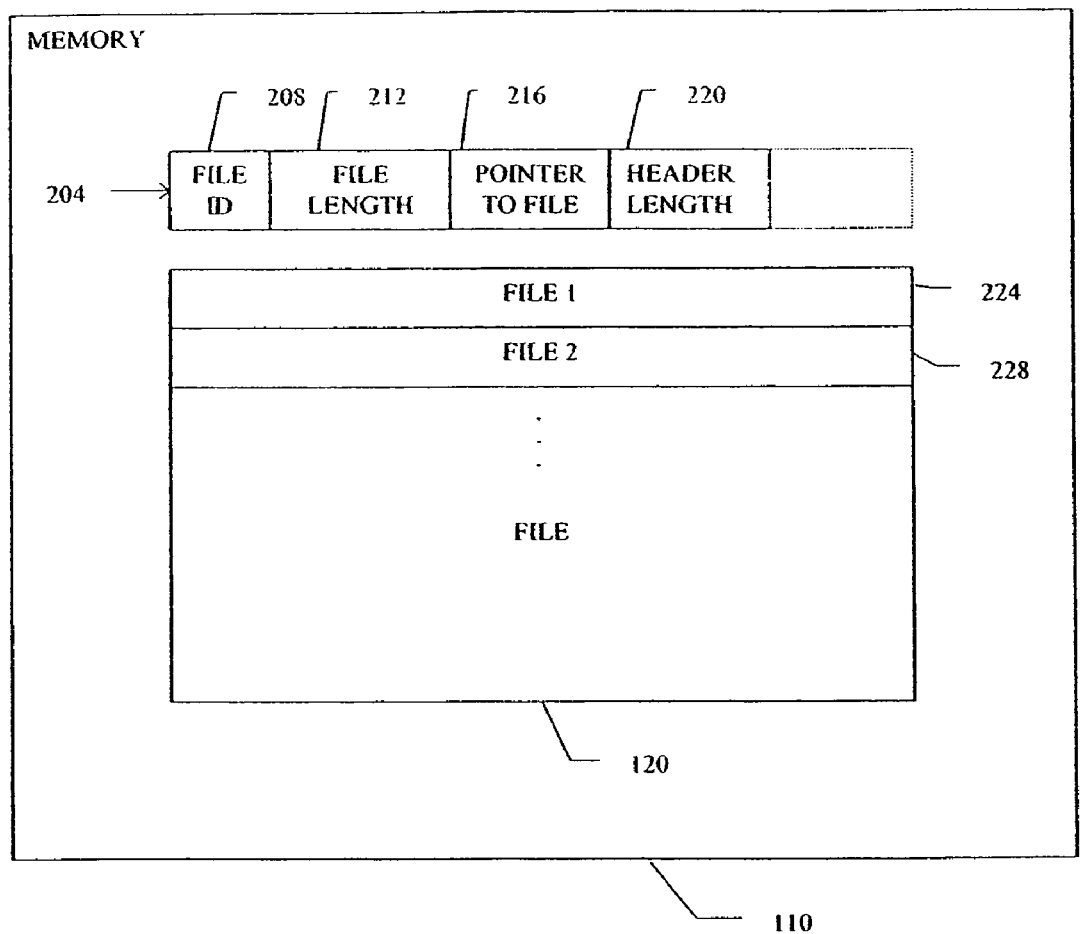
FIG. 2 is a format diagram showing file and file header formats in accordance with the present invention.

The mobile phone 104 has an antenna 124 for transmitting requests 116 and for receiving, inter alia, downloaded files 120. The mobile phone 104 also includes a transmitter 128 and a file receiving module 132 communicatively connected to the antenna 124 via a switch 136. A data and control bus 140 is configured to provide mutual connections among the transmitter 128, the file receiving module 132, a data length module 144, a resource pre-checking module 148, a resource sufficiency module 152, a memory 156, a keyboard 160, a timer 164, a power module 168 and a display screen 170. The modules 132, 144, 148, 152 may be implemented as program steps rather than separate electronic circuits or elements. The memory 156, which may be RAM, ROM or any other kind of computer memory, optionally includes a data table 172 of file lengths indexed by file identifiers and optionally includes a data table 176 with entries indicating the amount of resource that is consumed per each byte (or, more generally, for each of a predetermined amount) of downloaded data. The "amount of resource that is consumed per given amount of downloaded data" is preferably the "amount of resource that is consumed per given amount of data that has been successfully downloaded." Thus, for example, if some data is corrupted in transit and must be resent, thereby consuming more of the resource, then the amount of resource consumed per byte increases. Accordingly, as used herein, references to consumption per given amount of downloaded data refer to, and assume, consumption per given amount of successfully downloaded data FIG. 2 is an exemplary format diagram of a file 120 to be downloaded and an associated header 204 residing in the memory 110 of host computer 108. Header 204, itself a "collection of data", has a file identifier 208, a file length or size 212 (in bytes) and a file pointer 216 which points to an address of host computer memory 110 at which the file 120 is located. Header 204 includes an additional field for the header length 220 (in bytes), although it may alternatively have a header termination character and rely on the recipient to calculate the header length 220. Header 204 may also include, as indicated by the dotted line, additional data descriptive of file 120. Header 204 can alternatively be a standard header of any file transfer protocol that is implementable to include, or which already includes, a file size field in the header. Examples of such standard file transfer protocols are File Transfer Protocol (FTP), which operates under Transmission Control Protocol/Internet Protocol (TCP/IP) and on the Internet, Trivial File Transfer Protocol (TFTP), and the Binary Large Asset Stateless Transfer (BLAST) data communication protocol. File 120 may comprise more than one file transferred or to be transferred to mobile unit 112 by a single downloading operation, and is therefore shown by way of example in FIG. 2 as including two files 224, 228 and a series of dots to indicate additional files.

Figure 3:
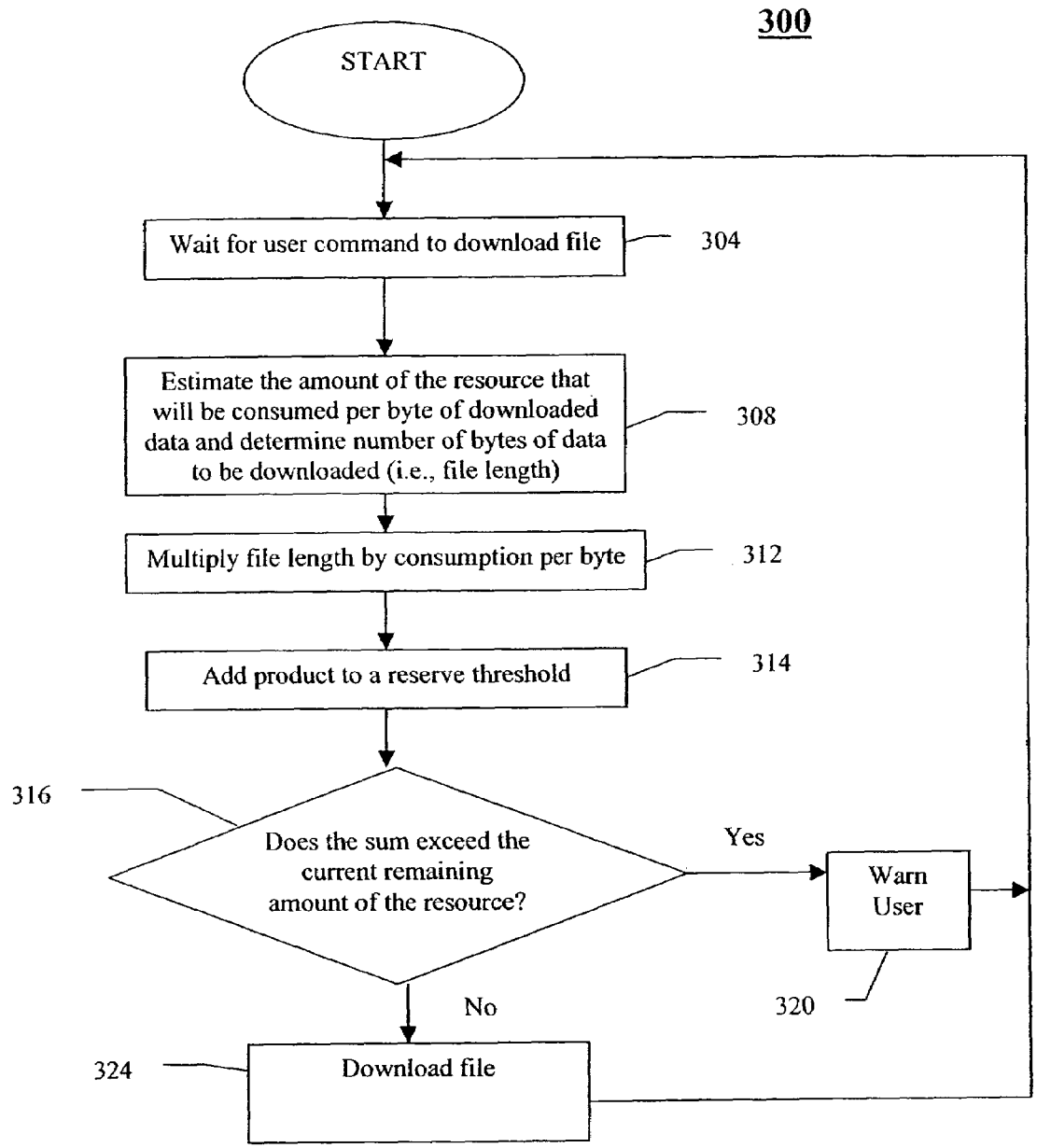
FIG. 3 is a flow chart of conditional downloading based on the status of a single resource in accordance with the present invention.

FIG. 3 is a flow chart illustrating an example of a conditional downloading process 300 in accordance with a first embodiment of the inventive method. The process 300 waits for a user to enter a command from the keyboard 160 to download a file 120 (step 304). Alternatively, the command can be entered by another type of input device, as by a light pen applied to the screen 170 to select a menu choice. The menu may include alternative selectable commands, such as "download", and may further present file identifiers from the file lengths data table 172 if the file to be downloaded is a member of a predefined set of files. Otherwise, the file to be downloaded is any arbitrary file, an identifier (e.g. location URL) of which can be entered into the mobile phone 112 by the user in conjunction with execution or selection of the download command.

In response to the download command, (1) an estimate is made of the amount of the resource (e.g., battery energy) that will be consumed per byte of data to be downloaded, and (2) the number of bytes of data to be downloaded is determined (step 308). These two results are multiplied together (step 312). The product, which represents a "gross amount" of the resource that would be consumed in downloading the file, is then added to a predetermined threshold that represents a resource reserve (step 314), and the sum is compared to the current remaining amount of the resource being monitored (step 316). If the sum exceeds the current remaining amount, the user is notified via an error message to display screen 170 and/or a tone or alarm (step 320), and the file 120 is not received. If, on the other hand, the sum does not exceed the current remaining amount, then the download proceeds (step 324). The download is triggered in the host 108 by a request 116 sent to the host via base station 104. If the BLAST protocol is used, the request 116 for a download is a DownloadStart message. Once the download is either withheld (step 320), or granted and performed (step 324), the conditional downloading process 300 awaits a next download command (step 304).

Figure 4:
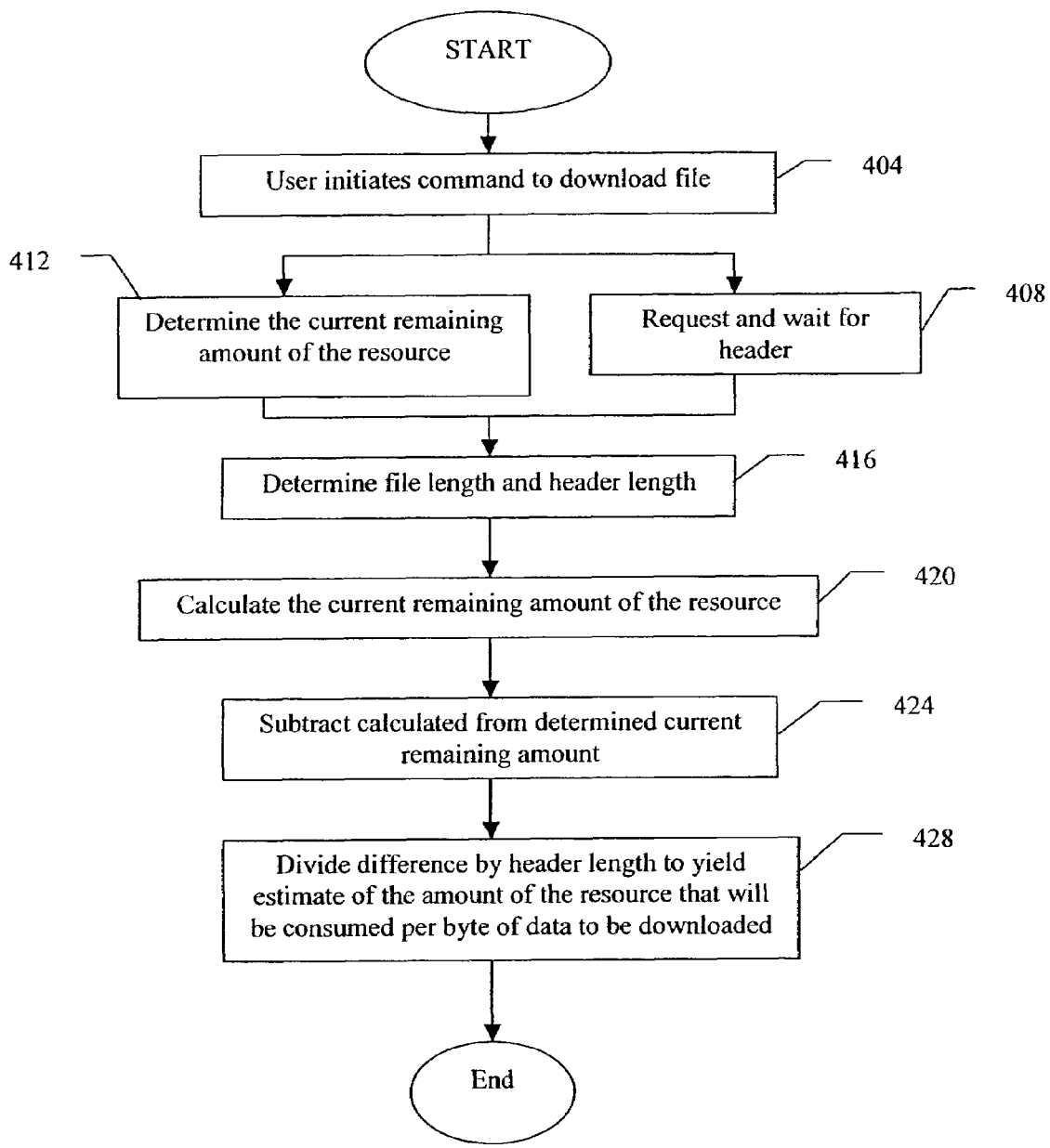
FIG. 4 is a flow chart of conditional downloading based on successive measurements of resource availability in accordance with the present invention.

The flow chart of FIG. 4 depicts a preferred embodiment of a method for obtaining the estimate of step 308. When the user initiates a command to download a file 120 (step 404), the request 116 is sent to the host 108 via base station 104. This request may, for example, be a GetFilesize message under the BLAST protocol, which returns to the client a file header containing a file size. In any event, in responding to the request the host 108 transmits back the file header 204, in a transmission that may also include the file (step 408).

Preferably concurrent with the request, the current remaining amount of a resource, as for example energy, within the mobile phone 112 is determined by the resource pre-checking module 148 (step 412). The current remaining amount of energy in a battery within the power module 168 is measured by the resource pre-checking module 148 using any known or otherwise appropriate method, such as the techniques disclosed in U.S. Pat. No. 5,870,685 which is incorporated herein by reference. When file header 204 arrives from host 108, the file length 212 and header length 220 are determined (step 416), as by their extraction from the received header. Extraction of the file length from the header is not necessary if the mobile phone 112 includes a file lengths data table 172 and the command to download is directed to a file identified in the table 172, in which case the file length is already provided in the table. As mentioned above, the header length may be determined by detecting a termination character if a header length field 220 does not exist. The process of receiving the header will, at least partially, deplete the resource being monitored which, in the current example, is assumed to be energy that would otherwise be available to operate the mobile phone 112.

When reception of the header 204 is complete, an extrapolation or estimate of the amount of the resource that will be required to download the file 120 is made based on the usage of the resource in downloading the header. This extrapolation or estimate is based on an assumption that any transient factors affecting power consumption during download of the header remain approximately constant during both the header and ensuing file downloads.

To calculate the estimate, the current remaining amount of the resource is measured (step 420) as was done in step 412. The updated current remaining amount of the resource from step 420 is subtracted from the current remaining amount determined in step 412 to thereby yield a difference, i.e., the amount of resource depleted during reception of header 204 (step 424). That difference is divided by the header length 220 (step 428) to provide an estimate of the amount of resource consumed per byte. That estimate is then multiplied by the byte count in step 312.

In operation, a user employs the keyboard 160 or other input or control device to identify from screen 170 a data collection or file for download and enters a download command, as from the keyboard. Transmitter 128 sends a header request 116 via antenna 124 to the base station, which retrieves the header from the memory 110 of host computer 108. Transmitter 128 toggles switch 136 to prepare the mobile phone 112 for reception. Meanwhile, the resource pre-checking module 148, through signaling with power module 168 via bus 140, determines the current remaining amount of the resource and forwards that determination to resource sufficiency module 152. Base station 104 relays the file header via base station 104 and antenna 124 to file receiving module 132, which stores the header in memory

156. The data length module 144 determines the file and header lengths from the file length field 212 and header length field 220, respectively, or by other means, and forwards both lengths to resource sufficiency module 152. The resource pre-checking module 148 again determines the current remaining amount of the resource and forwards that determination to resource sufficiency module 152, which subtracts the latest determination from the former, divides the difference by the header length, and multiplies the result by the file length. Resource sufficiency module 152 then adds the calculated product, i.e., the amount of the resource to be spent in the download, to a predetermined "resource reserve" threshold and compares the resulting sum to the most recent determination of the current remaining amount. If the sum is greater, then resource sufficiency module 152 retrieves an appropriate error message from memory 156, and displays the error message on screen 170, and the file is not downloaded. If, on the other hand, the sum is not greater, then resource sufficiency module 152 causes transmitter 128 to send a file request via antenna 124 to host computer 108 via base station 104 and causes file receiving module 132 to receive the file by the reverse route. File receiving module 132 directs the received file for storage in memory 156.

Alternatively, empirical data gathered in receiving the file header 204 can be used in calculating a download resource consumption estimate for file 120 even without making before-and-after header-reception measurements of the remaining amount of the subject resource, since the file 120 and its adjacent header 204 follow a common transmission path.

Figure 5:
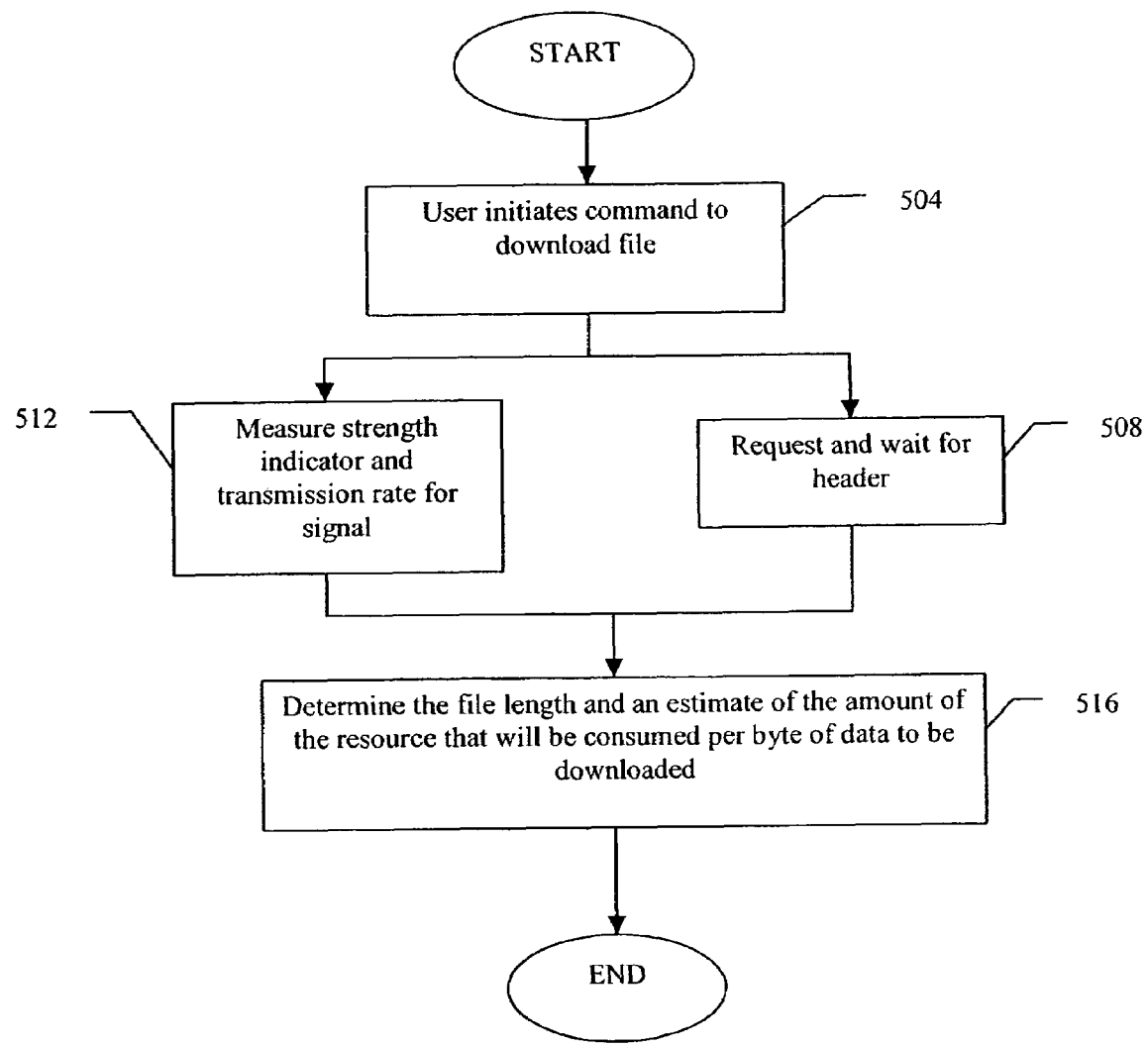
FIG. 5 is a flow chart of conditional downloading based on signal strength in accordance with the present invention.

FIG. 5 illustrates by way of example a method for estimating file length and resource consumed per byte, which is the subject of step 308, (FIG. 3) so that only a single remaining-resource measurement (not shown) is required. As seen in FIG. 5, user initiation of a command to download a file 120 (step 504) triggers three concurrent events.

First, a request issues for header 204 (step 508) from which the file length is subsequently determined (step 516) if the file lengths data table 172 is not implemented or does not reference the particular file to be downloaded.

Second, file receiving module 132 measures, while the header is downloading, the transmission rate for the signal. The transmission rate, as used herein, is the rate at which data bytes in the signal are received at the mobile phone 112, irrespective of whether a byte is received successfully, i.e., in usable condition. The transmission rate is indicative of the length of time that is required to complete a download of a file of given length. During that download time, events such as lighting of the keyboard 160 and screen 170 and periodic monitoring of incoming pages from base station 104 consume power that would otherwise be available to mobile phone 112. Accordingly, the transmission rate is correlated with resource consumption per byte (negatively, since one variable increases as the other decreases). That is, the lower the transmission rate, the more time it takes to download each byte, and the more energy is expended during the download. Conversely, the higher the transmission rate, the less time is spent downloading each byte, and the less energy is expended.

If header 204 is shorter than a predetermined threshold, then transmission of the header may not provide a reliable basis for calculating the file transmission rate, and a default transmission rate stored in memory 156 may instead be used. This default transmission rate may be updated from time-to-time as an average transmission rate for the mobile phone 112 and is periodically determined or reassessed.

Optionally, for example, the transmission rate may be monitored during download of header 204 and of file 120 and stored for future reference. To update the default transmission rate, all stored transmission rates for previous downloads (or, optionally, previous wireless data receptions of any kind) that have been performed within a predetermined preceding time period are averaged to yield the default transmission rate, as discussed below.

The third concurrent event is measurement, by file receiving module 132, of the strength of the signal carrying header 204 to yield a strength indication, e.g., an RX Level in GSM systems and RSSI (received signal strength indication) in analog systems (step 512).

The transmission rate serves only as a measure of how frequently data bytes are received (whether successfully or unsuccessfully) during a download. If received bytes are rejected due to poor signal quality, and then, as is typical, resent in a subsequent transmission (because the download does not include error-correcting codes, and their associated overhead), the download takes more time and, therefore, consumes more power. Since it is assumed herein that resource consumption per byte denotes resource consumption per byte that is successfully downloaded, a weak signal causes mobile phone 112 to consume more energy per byte. The effect of a weak signal is more pronounced if rejection of a byte entails retransmission of a whole block of data which contains that byte. Accordingly, the energy expended per byte is a variable that correlates to both transmission rate and signal strength indication. Lower transmission rates consume more energy per byte, and vice versa. Lesser signal strength requires more energy per byte and vice versa.

An estimate of the resource consumption per byte for the data to be downloaded (step 516) can be made based on an observed relationship between detected strength indication, transmission rate and actual a priori measurements of the resource consumption per byte. For example, such observations can be applied to a multiple regression analysis to define resource (energy) consumption per byte as a planar or non-planar function of the measured transmission rate and measured signal strength. Consumption per byte can be calculated on-the-fly based on the derived functions, or the functions can be repetitively applied beforehand to generate the resource per byte table 176.

In any event, the determined resource consumption per byte (step 516) is multiplied by the file byte length (step 312), the current remaining amount of the resource is determined (in this embodiment, merely once), and the sum of the product and a reserve threshold is compared to the current remaining resource amount (step 316).

Figure 6:
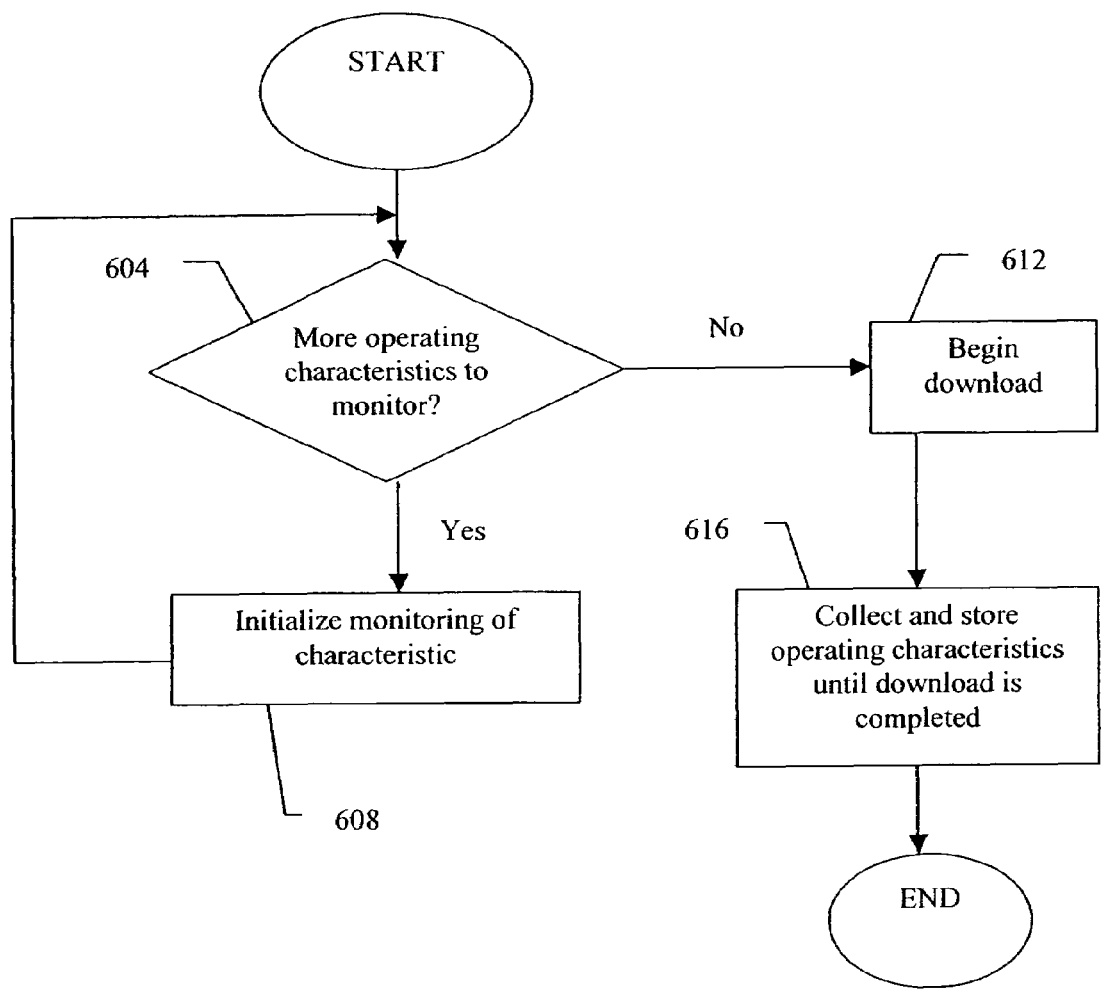
FIG. 6 is a flow chart of the monitoring of operating characteristics in accordance with the present invention.

FIG. 6 is a flow chart depicting by way of example an optional method for gathering statistics on operating characteristics, e.g., transmission rate, during downloading of the header 204 and/or file 120. It is first determined whether any mobile phone operating characteristics, such as download transmission rate, which are to be monitored have not yet been initialized (step 604). If an operating characteristic is yet to be initialized, then initialization is performed for that characteristic (step 608). If, on the other hand, initialization has already been performed for all operating characteristics to be gathered, the download of header 204 or file 120 begins (step 612) in accordance with steps 508 or 324, respectively. During this download, the operating characteristics are collected and stored in a circular buffer in memory 156 with a time stamp issued by timer 164. The operating characteristics to be stored may accordingly include, for example, a transmission rate for the download. The transmission rates for recent downloads are averaged in the embodiment of FIG. 5, as discussed above, to produce a default transmission rate.

Another operating characteristic related to signal quality is the distance between the mobile phone 112 and base station 104. Thus, if for example mobile phone 112 is located at the boundary of the cell or transmitting region of base station 104, then the quality of the signal may suffer, resulting in a concomitantly increased likelihood that a data byte that is received by mobile phone 112 will be unusable.

If, as mentioned above, downloaded data is not usable, it is rejected and retransmission is requested. Processing of the request and retransmission consume more of the resource being monitored and, therefore, increase the resource consumption per byte of data to be downloaded.

Base stations regularly transmit control signals to adjust the transmitting power of mobile devices within the cell of the base station. These control signals may sometimes include information on the distance between the mobile device and base station so that the mobile device can accordingly adjust its transmitting power.

Figure 7:
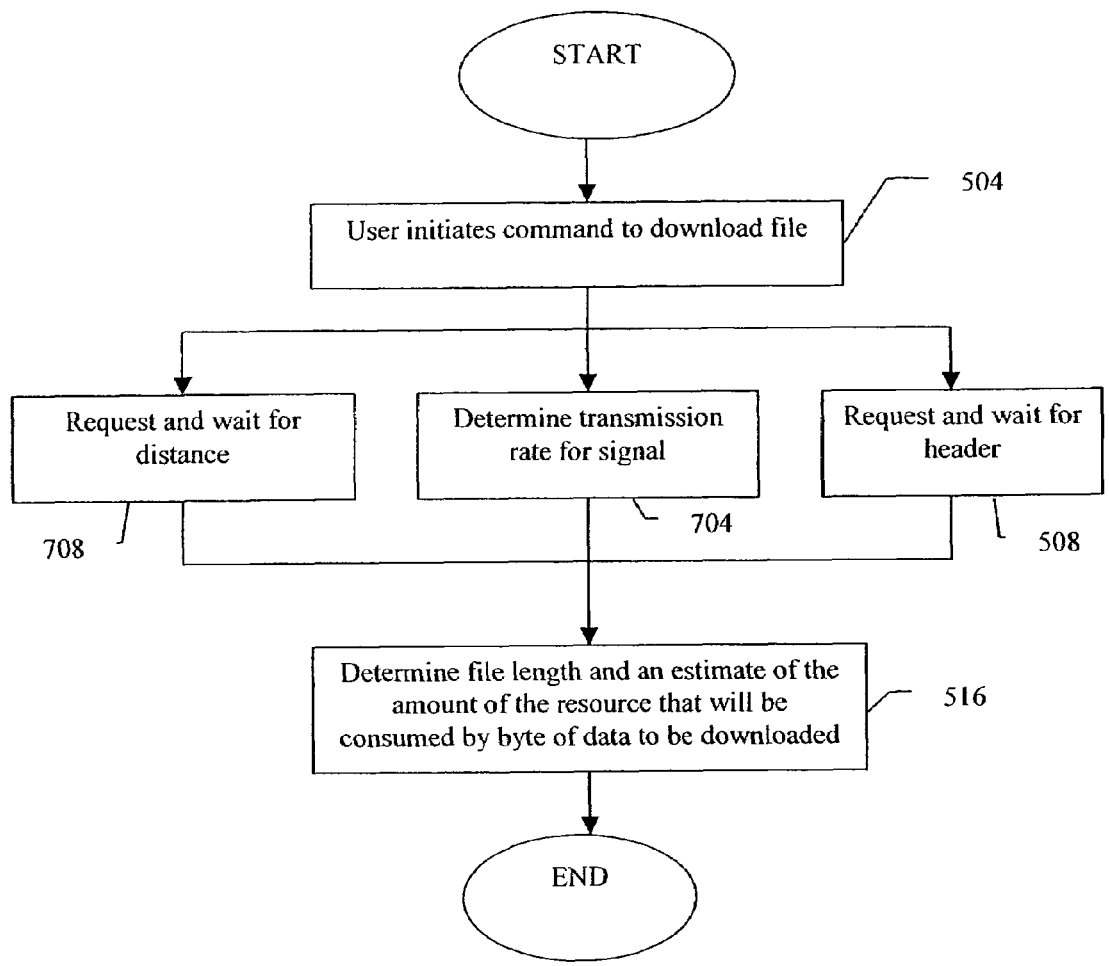
FIG. 7 is a flow chart of conditional downloading based on a phone-to-base station distance in accordance with the present invention.

FIG. 7 shows an exemplary method that utilizes the known mobile phone-to-base station distance to estimate the amount of the resource required for a download (step 308); the FIG. 7 embodiment is similar to that shown in FIG. 5, with like steps receiving like reference numerals, except that the FIG. 7 method utilizes the mobile phone-to-base station distance, instead of signal strength. Mobile phone 112 need not therefore include circuitry for measuring signal strength, and can instead rely on the mobile phone-to-base station distance that is provided by base station 104.

Referring now to FIG. 7, once a command to download a file 120 is initiated by the user (step 504), three concurrent events occur. First, the header 204 is requested by mobile phone 112 and is awaited from host 108 by way of base station 104 (step 508). Second, the transmission rate for the signal is determined, as in the FIG. 7 embodiment (step 704). Third, a measurement of the distance between mobile phone 112 and base station 104 is requested by mobile phone 112 and awaited from the base station (step 708).

When in the embodiment of FIG. 7 a user initiates a command to download a file (step 504), mobile phone 112 sends a request to the base station for distance information. If mobile phone 112 fails to receive a response to that distance request within a predetermined time period after it receives a response to its header request, a default distance stored in memory 156 is used. The default distance may be calculated in a manner analogous to that of calculating the default transmission rate in the previous embodiment. To determine the amount of the resource that will be consumed per byte, the distance information and transmission rate are correlated with consumption per byte in the same way that signal strength and transmission rate are correlated with consumption per byte in the FIG. 5 embodiment; that is, multiple regression is used to predict consumption per byte based on the determined or default distance and on the determined or default transmission rate.

Figure 8:
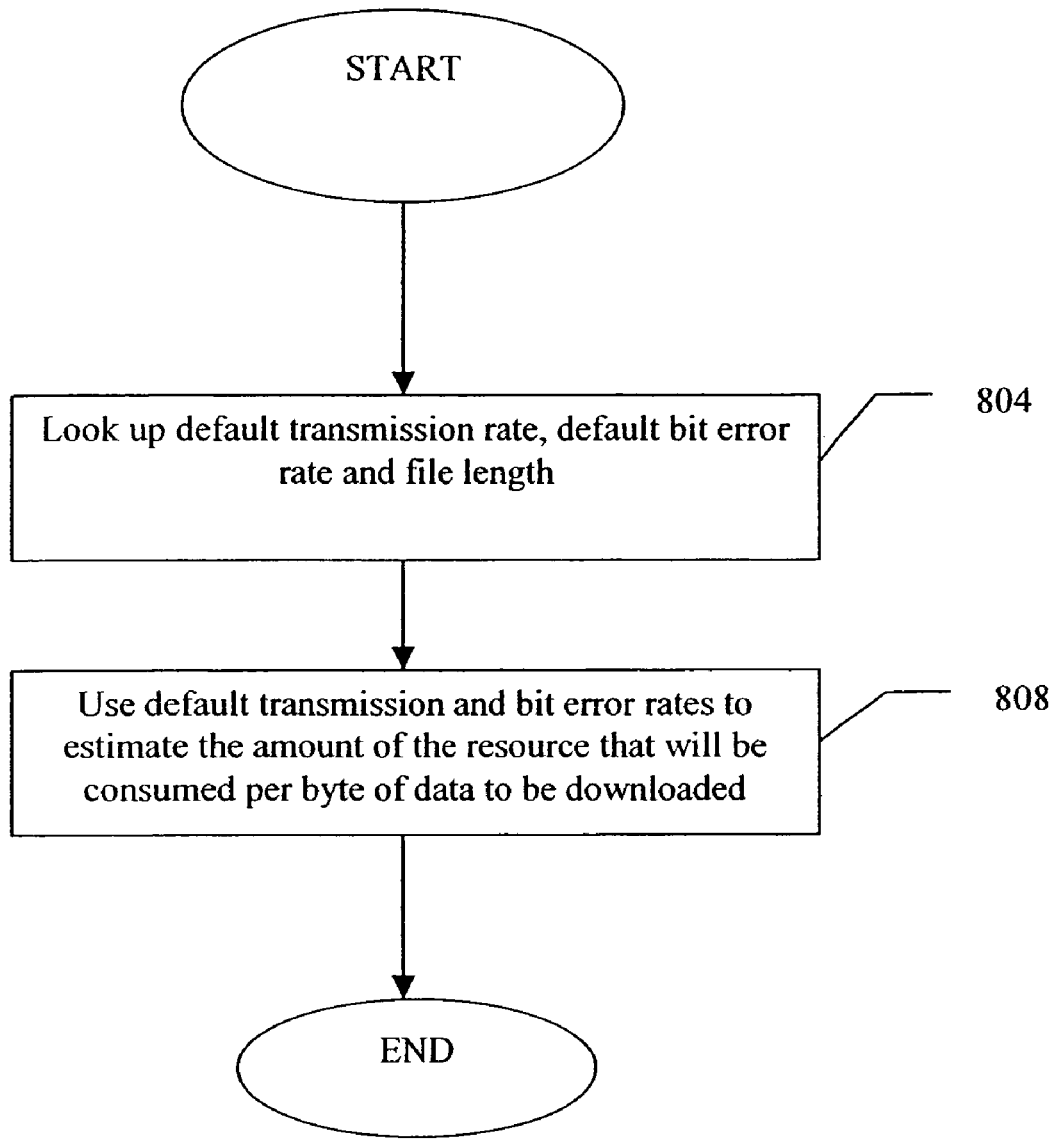
FIG. 8 is a flow chart of conditional downloading based on table lookup in accordance with the present invention.

FIG. 8 depicts an alternate method for estimating the resource required per byte for a download (step 308) that is based on the transmission rate and on a predicted bit error rate for the download. Like the signal strength indication, the bit error rate is an operating characteristic indicative of the probability that a downloaded byte of data will be unusable. Errors in downloaded data are detected by file receiving module 132 using any known or suitable technique such as parity coding, block coding and convolutional coding, and the bit error rate is calculated by resource sufficiency module 152.

Although the bit error rate may be assessed during downloading of the file header 204, it is assumed that header 204 will generally be too small to afford a reliable prediction of bit error rate. Accordingly, the bit error rate may be determined by a look-up of the default bit error rate (step 804) which has been derived from the experience of previous downloads using the technique shown in FIG. 6. If, however, there are insufficient recent downloads from which to derive a stored default bit error rate, then a default bit error rate is otherwise selected or determined based on prior communications.

The default transmission rate is also looked up as previously described in connection with the method of FIG. 6. The file length is shown in the embodiment of FIG. 8 as a value that is looked up from the file lengths data table 172. This embodiment is therefore confined to the downloading of files that are represented in table 172, although it could be modified to retrieve file length from header 204 as in other herein-described embodiments.

In any event, the default transmission rate and default bit error rate are applied to a multiple regression function to estimate the amount of the resource that will be consumed per byte of data to be downloaded (step 808).

Although the foregoing embodiments have incorporated the withholding of a download where the determined reserve power is found to be insufficient to complete the download, the scope of the invention is intended to extend to interruption or termination of a file download that is already in progress based on insufficient remaining levels of an available resource.

It is also noted that, instead or in addition to those described in conjunction with the foregoing embodiments, various other ones or combinations of operating characteristics can be monitored to determine resource consumption per byte. Thus, for example, transmission rate, signal strength and bit error rate can all be assessed in a single determination of consumption per byte.

In the various embodiments described herein, the multiple regression used in determining resource consumption per byte can also be based on functions of the operating characteristics, rather than directly on those operating characteristics. Thus, for example, the mobile phone-to-base station distance can be truncated by a set amount if the residual distances bear a markedly different, e.g., higher, correlation to consumption per byte than do the distances before truncation. By truncating the distance, only mobile units near the periphery of the cell are considered, since such mobile units are more affected by interference from other cells and experience the greatest signal quality degradation rate, and thus incremental power consumption, with increasing distance.

Even though multiple regression has been indicated as a methodology by which consumption per byte is determined, other methods for calculating consumption per byte can alternatively be employed, whether based on analytical functions or on derivations from empirical data.

Moreover, although the foregoing examples identify energy contained in the battery of the mobile terminal as the expendable resource to be monitored for reserve sufficiency, the herein-disclosed embodiments are likewise applicable where time, money or memory space is the resource expended during the download and monitored for reserve sufficiency. For example, and with further reference to FIG. 8, the transmission rate and bit error rate during a download to the mobile phone affect the time expended. In addition, the user may have, with a mobile phone or PDA service provider, an account that is pre-paid to a fixed amount of money or which has a pre-set credit limit. If the airtime for the month exceeds a threshold, the funds in the user's account may be insufficient to cover the time used; in this case, therefore, money is a resource that is consumed during a download and may be monitored for reserve sufficiency.

As an additional example, memory that is devoted to storing a file to be downloaded and which is therefore unavailable for other purposes, e.g., processing of business data or applications, may be quantifiable as a monetary resource that is lost to the user who may set a current remaining amount of money that is expendable in operating the mobile device. Thus, in FIG. 3, for example, the resource can be money.

Figure 9:
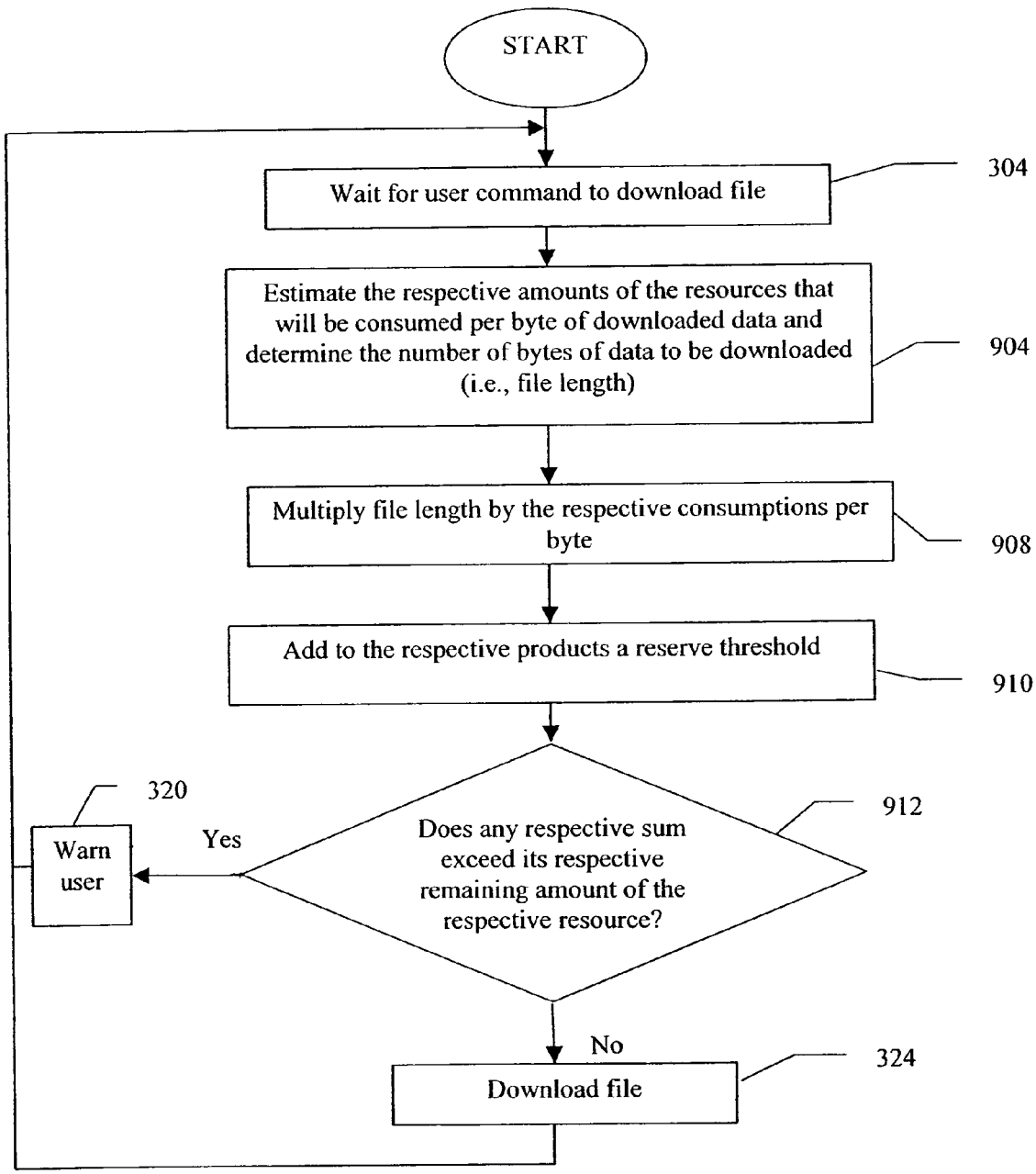
FIG. 9 is a flow chart of conditional downloading based on the status of multiple resources in accordance with the present invention.

More generally, the scope of the invention includes the making of a download contingent on the availability of multiple resources that are expendable in operating the mobile terminal. The embodiment of FIG. 9 is similar to that of FIG. 3 but checks for the availability of more than one resource. When a user downloads a file 120, (step 304), an estimate is made of the resources that will be consumed per byte of downloaded data, and the file length 212 is determined (step 904). The file length 212 is multiplied by the respective resource consumptions per byte to yield respective products (step 908). To each respective product, a respective reserve threshold is added to yield a respective sum (step 910). The respective sums are then compared to the respective remaining amounts (step 912), and, if any respective sum exceeds its respective remaining amount, the user is warned (step 320). Otherwise, the file 120 is downloaded (step 324).

Thus, while there have been shown and described and pointed out fundamental novel features of the invention as applied to preferred embodiments thereof, it will be understood that various omissions and substitutions and changes in the form and details of the methods described and devices described and illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Substitutions of elements from one described embodiment to another are also fully intended and contemplated. It is the intention, therefore, to be limited only as indicated by the scope of the claims appended hereto.

What is claimed is:

1. An apparatus comprising a processor configured for determining whether to receive information, the apparatus having associated therewith a consumable resource that has a current remaining amount, the apparatus comprising:
    a data collection receiving module operable for receiving, over a network, a collection of data having a size and an associated header, said header having a size and an indicator of the size of the collection of data, receiving of the data collection causing the apparatus to consume the resource and to correspondingly modify the current remaining amount;
    a data length module for determining a size of the collection of data based on the associated header;
    a resource pre-checking module for determining the current remaining amount; and
    a resource sufficiency module for determining an amount of the resource consumed for each of a predetermined amount of data received and for determining, based on said determined amount of the resource consumed and the size of the collection of data indicated by the header, an amount of the resource that would be consumed in receiving the collection of data, for use by the resource sufficiency module to cause the data collection receiving module to receive the collection of data only if the current remaining amount exceeds, by at least a predetermined threshold, said determined amount of the resource that would be consumed,
    wherein said determining by the resource sufficiency module of the amount of the resource consumed for each of a predetermined amount of data received is based on successive determinations by the resource pre-checking module of the current remaining amount and on a size of one or more additional collections of data received by the data collection receiving module over the network.

2. The apparatus of claim 1, further including a lookup table that indexes a size of the collection of data by an identifier of the collection of data.

3. The apparatus of claim 1, further including a data table comprising an entry for the said amount of the resource consumed for each of the predetermined amount of data received, said resource sufficiency module being operative to read said data table to determine the amount of the resource consumed for each of the predetermined amount of data received.

4. The apparatus of claim 1, wherein the resource pre-checking module is operative to determine the current remaining amount before and after the data collection receiving module receives the header, the data length module is operative to determine the header size, the resource sufficiency module is operative to subtract the current remaining amount after reception of the header from the current remaining amount before reception of the header and to divide the result by the determined header size to determine the amount of the resource consumed for each of the predetermined amount of data received.

5. The apparatus of claim 4, wherein the consumable resource comprises energy and wherein the amount of the resource consumed for each of the predetermined amount of data received comprises a quantity of energy consumed for each of the predetermined amount of data received.

6. The apparatus of claim 5, wherein the resource sufficiency module is operative to multiply said amount of the resource consumed for each of the predetermined amount of data received by the indicated size of the collection of data to determine the amount of resource that would be consumed in receiving the collection of data.

7. The apparatus of claim 1, wherein said consumable resource comprises energy, wherein the resource sufficiency module is operable for determining a strength indication for a signal received over the network, and wherein said determining by the resource sufficiency module of the amount of the resource consumed for each of the predetermined amount of data received is based on the determined strength indication.

8. The apparatus of claim 1, wherein the collection of data comprises multiple files.

9. The apparatus of claim 1, wherein the consumable resource comprises one of an amount of time consumable in operating the apparatus and an amount of money consumable in operating the apparatus.

10. The apparatus of claim 1, wherein the resource sufficiency module is operable to determine an error rate of a signal received over the network, and wherein said determining by the resource sufficiency module of the amount of the resource consumed for each of the predetermined amount of data received is based on the determined error rate.

11. The apparatus of claim 1, wherein the apparatus comprises a mobile terminal.

12. The apparatus of claim 11, wherein the collection of data received over the network is received by the mobile terminal from a base station, wherein the resource comprises energy, and wherein said determining by the resource sufficiency module of the amount of the resource consumed for each of the predetermined amount of data received is based on a distance between the mobile terminal and the base station.

13. The apparatus of claim 12, wherein said determining by the resource sufficiency module of the amount of the resource consumed for each of the predetermined amount of data received is further based on a rate at which a collection of data is received by the data collection receiving module over the network.

14. The apparatus of claim 11, wherein the mobile terminal comprises a mobile phone.

15. The apparatus of claim 1, wherein the consumable resource comprises an amount of energy consumable in operating the apparatus.

16. The apparatus of claim 1, wherein the consumable resource comprises one of an amount of time consumable in operating the apparatus, an amount of money consumable in operating the apparatus and an amount of energy consumable in operating the apparatus.

17. The apparatus of claim 1, wherein the apparatus has at least one other resource consumable in operating the apparatus, the at least one other resource having respective current remaining amounts, the resource sufficiency module being operative for determining respective amounts of the at least one other resource consumed for each of the predetermined amount of data received and respective amounts of the at least one other resource that would be consumed in receiving the collection of data.

18. The apparatus of claim 17, wherein the consumable resource and the at least one other consumable resource comprise at least two of time, money and energy.

19. The apparatus of claim 1, wherein the predetermined amount of data received is a predetermined amount of data successfully downloaded to the apparatus over the network.

20. The apparatus of claim 1, wherein the collection of data is contained in a signal transmitted to the apparatus, and wherein the resource sufficiency module is operative for calculating said amount of the resource consumed for each of the predetermined amount of data received based on a rate at which data of the transmitted signal is received by the apparatus and at least one of a strength indication of the signal, a bit error rate of the signal and a distance over which the signal is transmitted for receipt at the apparatus.

21. A method for determining whether an apparatus is to receive information to be sent by wireless transmission over a network, the apparatus having associated therewith a consumable resource that has a current remaining amount, the method comprising:
    determining said current remaining amount of the resource, the resource being consumable in receiving collections of data that are sent by wireless transmission over the network and that have respective sizes and an associated header, the header having a header size and an indicator of the size of the collection of data;
    determining an amount of the resource consumed for each of a predetermined amount of data received based on the associated header based on successive determinations of the current remaining amount and on a size of one or more additional collections of data received by the data collection receiving module over the network;
    determining, based on said predetermined amount and on the respective size of a collection of data to be received indicated by the header, whether the determined current remaining amount exceeds, by at least a predetermined threshold, a gross amount of the resource that would be consumed in receiving the collection of data; and
    receiving the collection of data only if said current remaining amount has been determined to exceed, by at least the predetermined threshold, the gross amount of the resource that would be consumed by receipt of the collection of data.

22. The method of claim 21, wherein said determining the amount of the resource consumed for each of the predetermined amount of data received comprises: determining, after the receiving the header, an updated current remaining amount of the resource; subtracting the determined updated current remaining amount from the determined current remaining amount to yield a difference; determining the header size; and dividing the yielded difference by the determined header size to calculate the amount of the resource consumed for each of the predetermined amount of data received.

23. The method of claim 22, wherein said determining whether the current remaining amount exceeds the gross amount comprises: extracting the respective size of the collection of data from the header; multiplying the extracted size of the collection of data by the calculated amount of the resource consumed for each of the predetermined amount of data received to yield a product; adding the yielded product to a predetermined threshold to yield a sum; and comparing the yielded sum to the updated current remaining.

24. The method of claim 21, wherein the consumable resource comprises energy.

25. The method of claim 24, further comprising determining a rate at which a collection of data of said collections of data is received, said determining of the amount of the resource consumed for each of the predetermined amount of data received being based on the determined rate.

26. The method of claim 25, further comprising determining a strength indication for a signal carrying a collection of data of said collections of data, said determining of the amount of the resource consumed for each of the predetermined amount of data received being further based on the determined strength indication.

27. The method of claim 25, further comprising determining a bit error rate for a signal carrying a collection of data of said collections of data, said determining of the amount of the resource consumed for each of the predetermined amount of data received being further based on the determined bit error rate.

28. The method of claim 25, further comprising determining a distance over which a signal carrying a collection of data of the collections of data is received from a base station, said determining of the amount of the resource consumed for each of the predetermined amount of data received being further based on the determined distance.

29. A computer-readable medium encoded with computer program instructions for determining whether to receive information, wherein execution of the instructions by a processor causes the processor to perform operations comprising:
    determining a current remaining amount of a resource, the resource being consumable in receiving a collection of data having a size and an associated header, the header having a size and an indicator of the size of the collection of data;

determining an amount of the resource consumed for each of a predetermined amount of data received based on the associated header based on successive determinations of the current remaining amount and on a size of one or more additional collections of data received by the data collection receiving module over the network;

determining, based on said determined amount and on the size of the collection of data indicated by the header, whether the determined current remaining amount exceeds, by at least a predetermined threshold a gross amount of the resource that would be consumed in receiving the collection of data; and receiving the collection of data only if the determined current remaining amount exceeds, by at least the predetermined threshold, the gross amount of the resource that would be consumed.

30. An apparatus for determining whether to receive information, the apparatus having associated therewith a consumable resource that has a current remaining amount, the apparatus comprising:

means for data collection operable for receiving, over a network, a collection of data having a size, receiving of the data collection causing the apparatus to consume the resource and to correspondingly modify the current remaining amount;

means for data length determination for determining a size of the collection of data;

means for resource pre-checking for determining the current remaining amount; and means for resource sufficiency determination for determining an amount of the resource consumed for each of a predetermined amount of data received and for determining, based on said determined amount of the resource consumed and the size of the collection of data, an amount of the resource that would be consumed in receiving the collection of data, for use by the resource sufficiency module to cause the data collection receiving module to receive the collection of data only if the current remaining amount exceeds, by at least a predetermined threshold, said determined amount of the resource that would be consumed;

wherein said means for resource sufficiency determination is configured for determining the amount of the resource consumed for each of the predetermined amount of data received based on successive determinations by the resource pre-checking module of the current remaining amount and on a size of one or more additional collections of data received by the data collection receiving module over the network.

* * * * *